H. W. GOUGH.
FENCE CLAMP.
APPLICATION FILED MAR. 25, 1912.
1,069,690.
Patented Aug. 12, 1913.
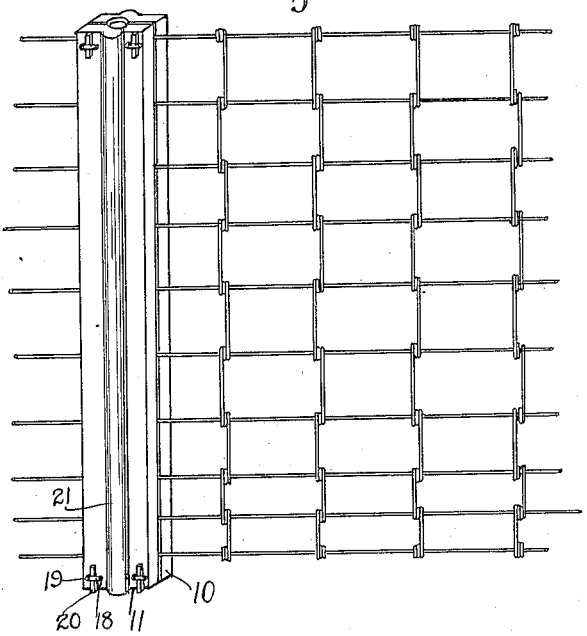
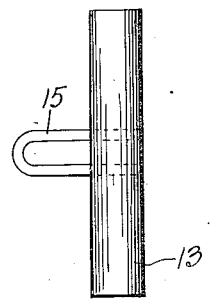
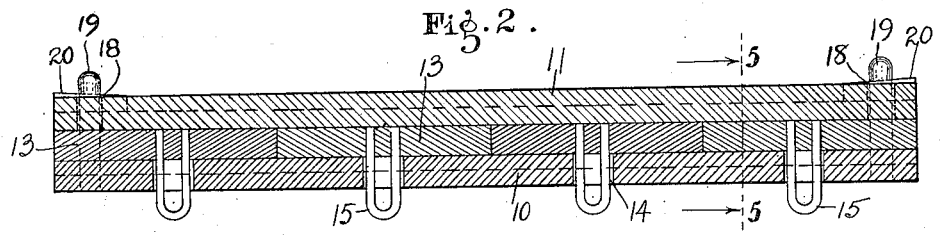
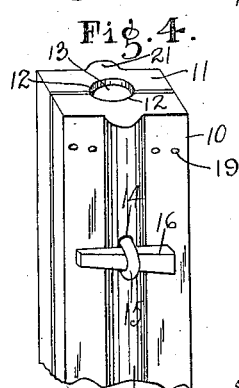
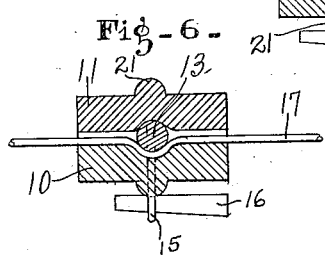
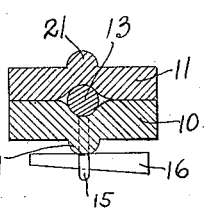
WITNESSES:
A H Edgerton
O. M. McLaughlin
INVENTOR.
Harlon W. Gough.
BY
V H Lockwood
ATTORNEY.
COLUMBIA PLANOGRAPH CO., WASHINGTON, D. C.

UNITED STATES PATENT OFFICE.

HARLEN W. GOUGH, OF MUNCIE, INDIANA.

FENCE-CLAMP.

1,069,690.　　　　Specification of Letters Patent.　　Patented Aug. 12, 1913.

Application filed March 25, 1912. Serial No. 686,189.

*To all whom it may concern:*

Be it known that I, HARLEN W. GOUGH, a citizen of the United States, and resident of Muncie, county of Delaware, and State of Indiana, have invented a certain useful Fence-Clamp; and I do hereby declare that the following is a full, clear, and exact description thereof, reference being had to the accompanying drawings.

The object of this invention is to provide an improved clamp for use in stretching wire fence during the erection of the same.

The nature of the invention will be understood from the accompanying drawings and the following description and claims.

In the drawings, Figure 1 shows my invention as used for stretching wire fencing while erecting the same. Fig. 2 is a longitudinal section midway through the clamp. Fig. 3 is a side elevation of one of the jaw members. Fig. 4 is a perspective of the opposite side of the clamp from that shown in Fig. 1, with portions broken away. Fig. 5 is a transverse section on the line 5—5 of Fig. 2, showing the clamps in the closed or idle position. Fig. 6 is the same as Fig. 5, but with the fence strand secured between the clamping members.

In detail there is shown in the drawings a fence clamp having two clamping members 10 and 11 which have longitudinal grooves 12 in their adjacent sides and in which a plurality of jaws or bending rods 13 lie for the purpose hereafter explained. The clamping members 10 and 11 are substantially the same excepting that from the groove 12 in the member 10 slots 14 are cut at regular intervals to allow the passage of the staple 15 from the bending bars 13. There is also a slot 18 near each end of the member 11 and upon each side of the groove 12 through which staples 19 from the member 10 extend and tapered pins 20 driven through the outer end of said staples secure the clamping members together. The slots 12 are substantially semicircular in outline and have their edges cut away to give greater clearance for the strand wire of the fence. Each of the clamping members has a semicylindrical rib 21 running longitudinally thereof upon the face opposite the groove 12.

The bending bars 13 are circular in cross section and are made of short rods to which are secured the staple-like projections 15, heretofore mentioned, which extend through the clamping bar 10 and are moved or drawn against said bar for the purpose of bending and clamping the strand wire of the fence by means of tapered pins 16. In length the series of these bending bars is equal to the length of the clamping plates 10 and 11.

When it is desired to stretch the strand wires of the fence having marginal strand wires of greater diameter than the intermediate strand wire, with the fence fabric lying upon the ground the clamping plate 10 with the groove 12 face up is slipped underneath the fence, afterward the bending bars 13 are placed upon the strand wires with the staples 15 extending through the slots 14 in the clamping plate. The clamping plate 11 is then placed upon the bending bars with the staples 19 extending through the slots 18 and the two clamping plates are then drawn together by means of the tapered keys 20. These will clamp the marginal strand wires between the two clamping plates 10 and 11. The fabric is then raised and the keys 16 are driven through the staples 14 from the bending bars 13 and the intermediate strand wires may be thus clamped to the clamping plate 10. The team or any other convenient means may be hitched to the clamping plates 10 and 11 and the fence fabric may be tightened and secured to the supporting post along the property line. Should the strand wires of the fence have crimped portions to take care of the expansion and contraction due to weather changes, and should any of the crimped portions come opposite and be of an opposite curve than one of the bending bars 13, then that bending bar may be removed and thus the crimp will not be taken out of the strand wire at that particular point. Similarly when erecting a diamond or triangular mesh fence, should the twisted portion of the mesh wires about any strand wire come opposite the bending bar as the clamping plates are placed in position that particular section of the bending bar may be left out and the other strand wires may be clamped and held as before described. Should the fence being erected have strand wires of all the same diameter and should none of the joints of the strand with the mesh wires come opposite the groove 12 in the lower clamping plate, the upper clamping plate may be inverted and the bead or rip 21 may be placed adjacent to groove 12 in the clamping plate 10 and the two plates may be drawn together by the tapered keys 20 without the use of the bending bars 13.

I claim as my invention:

1. A fence clamp including a pair of corresponding members with registering centrally located, longitudinal grooves in them having flat surfaces on both sides of the groove, and means for clamping said members together with the fence fabric between them, a crimping bar located in said grooves and having a convex surface, and means for clamping said crimping bar to one of said clamping members, whereby kinks will be formed in the wires, extending transversely through the device.

2. A fence clamp including a main clamping member, a series of separate crimping bars, one having a longitudinal groove and the other a corresponding rib fitting in said groove so that the fence fabric can be placed between them, and another clamping member corresponding with said main clamping member, and means for clamping said two clamping members so that the second clamping member will hold the crimping bars in place, and means for clamping said crimping bars to said main clamping member for forming kinks in the fence wire.

3. A fence clamping member including a main clamping member having a longitudinal groove in one side thereof, with holes leading from the groove to the other side of said member, a series of separate crimping bars adapted to fit in said longitudinal groove with the fence fabric between said bars and clamping member, with loops extending from said crimping members through the openings in said clamping member and wedges extending through said loops for clamping said bars and loops together, and another clamping member corresponding with the main member and adapted to be placed on said crimping bars for holding them in place during the assembly of the device, and means for securing said clamping members together.

In witness whereof, I have hereunto affixed my signature in the presence of the witnesses herein named.

HARLEN W. GOUGH.

Witnesses:
  E. H. MAYO,
  O. M. McLAUGHLIN.

---

Copies of this patent may be obtained for five cents each, by addressing the "Commissioner of Patents. Washington, D. C."